(12) United States Patent
Yoshitomi

(10) Patent No.: US 11,799,100 B2
(45) Date of Patent: Oct. 24, 2023

(54) FUEL CELL SYSTEM

(71) Applicant: HONDA MOTOR CO., LTD., Tokyo (JP)

(72) Inventor: Ryoichi Yoshitomi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/670,598

(22) Filed: Feb. 14, 2022

(65) Prior Publication Data
US 2022/0302478 A1   Sep. 22, 2022

(30) Foreign Application Priority Data
Mar. 22, 2021 (JP) ................................. 2021-047407

(51) Int. Cl.
| | |
|---|---|
| *H01M 8/04119* | (2016.01) |
| *H01M 8/0258* | (2016.01) |
| *H01M 8/2483* | (2016.01) |
| *H01M 8/2475* | (2016.01) |
| *H01M 8/04828* | (2016.01) |

(52) U.S. Cl.
CPC ..... *H01M 8/04134* (2013.01); *H01M 8/0258* (2013.01); *H01M 8/04843* (2013.01); *H01M 8/2475* (2013.01); *H01M 8/2483* (2016.02)

(58) Field of Classification Search
CPC ........... H01M 8/04134; H01M 8/0258; H01M 8/04843; H01M 8/2475; H01M 8/2483; H01M 8/04
See application file for complete search history.

(56) References Cited

U.S. PATENT DOCUMENTS

| | | | | |
|---|---|---|---|---|
| 2020/0099067 A1* | 3/2020 | Yoshitomi | ........... | H01M 8/2465 |
| 2020/0321646 A1* | 10/2020 | Naito | .................. | H01M 8/2475 |
| 2020/0388863 A1* | 12/2020 | Yoshitomi | ........... | H01M 8/0687 |
| 2020/0388873 A1* | 12/2020 | Naito | .................. | H01M 8/2484 |

FOREIGN PATENT DOCUMENTS

JP   2020-053234 A   4/2020

* cited by examiner

*Primary Examiner* — Stewart A Fraser
(74) *Attorney, Agent, or Firm* — Carrier, Shende & Associates P.C.; Fulchand P. Shende; Joseph P. Carrier

(57) ABSTRACT

A fuel cell system includes, in an auxiliary device case, a first layer, a second layer and a third layer in order from the end plate side, a coolant discharge pipe arranged in the first layer, cathode-side discharge pipes respectively connected to a plurality of oxygen-containing gas lead-out through holes which interpose the coolant discharge pipe, a plurality of first penetrating portions penetrating the first layer in the thickness direction, and a first connecting part provided in the second layer, extending in the layer direction of the second layer so as to straddle the coolant discharge pipe on the outer side, and connecting the plurality of first penetrating portions.

8 Claims, 7 Drawing Sheets

FUEL CELL SYSTEM

CROSS-REFERENCE TO RELATED APPLICATIONS

This application is based upon and claims the benefit of priority from Japanese Patent Application No. 2021-047407 filed on Mar. 22, 2021, the contents of which are incorporated herein by reference.

BACKGROUND OF THE INVENTION

Field of the Invention

The present invention relates to a fuel cell system.

Description of the Related Art

A fuel cell system includes a fuel cell stack in which a plurality of power generation cells are stacked one another. The power generation cells generate electric power utilizing a fuel gas and an oxygen-containing gas supplied thereto. The fuel cell system also includes auxiliary devices for adjusting the fuel gas and the oxygen-containing gas to be supplied to the fuel cell stack and piping for supplying a coolant to the fuel cell stack. In order to arrange these auxiliary devices and piping compactly, an auxiliary device case is provided adjacent to an end plate at one end of the fuel cell stack, and piping and a part of the auxiliary devices are accommodated in the auxiliary device case.

In a conventional fuel cell system, the auxiliary devices such as an injector and a humidifier are accommodated in the auxiliary device case together with piping for supplying and discharging a fuel gas, an oxygen-containing gas, and a coolant. In this case, some of the pipes may be constructed as a block-type pipe member in which bent flow paths are integrally formed into a lump (for example, JP 2020-053234 A).

SUMMARY OF THE INVENTION

However, in the fuel cell system, it is necessary to arrange piping while avoiding bulky structures such as the humidifier and the injector within a limited space inside the auxiliary device case. Therefore, the block-type pipe member may have a lower degree of freedom in layout, and may rather increase the entire size for avoiding interference with the bulky structures.

Accordingly, it is an object of the present invention to provide a fuel cell system capable of compactly arranging piping while avoiding interference with bulky structures.

One aspect of the present invention is to provide a fuel cell system including: a fuel cell stack having a pair of end plates; a plurality of through holes formed at a plurality of positions of one of the pair of the end plates and allowing a fuel gas, an oxygen-containing gas, and a coolant to pass, respectively, through the one of the pair of the end plates; an auxiliary device case provided adjacent to the one of the pair of the end plates through which the through holes are formed; cathode-side discharge pipes connected to at least two of the through holes to allow an oxygen-containing exhaust gas discharged from the fuel cell stack to flow therethrough; and a coolant discharge pipe connected to another of the through holes to allow the coolant discharged from the fuel cell stack to flow therethrough, wherein the auxiliary device case contains a first layer, a second layer and a third layer, the first layer being an innermost layer positioned closest to the one of the pair of the end plates, the second layer being positioned on an outer side of the first layer, the third layer being positioned on an outer side of the second layer, the coolant discharge pipe is disposed in the first layer, the cathode-side discharge pipes include: a plurality of first penetrating portions connected respectively to the at least two of the through holes on both sides of the coolant discharge pipe, and penetrating through the first layer in a layer thickness direction; and a first connecting portion provided in the second layer, extending in a layer direction so as to straddle the coolant discharge pipe on the outer side of the first layer, and connecting the plurality of first penetrating portions.

According to the fuel cell system of the above aspect, the piping can be appropriately laid out while avoiding interference with the bulky structures.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

Hereinafter, a preferred embodiment of the present invention will be described in detail with reference to the accompanying drawings.

Figure 1:
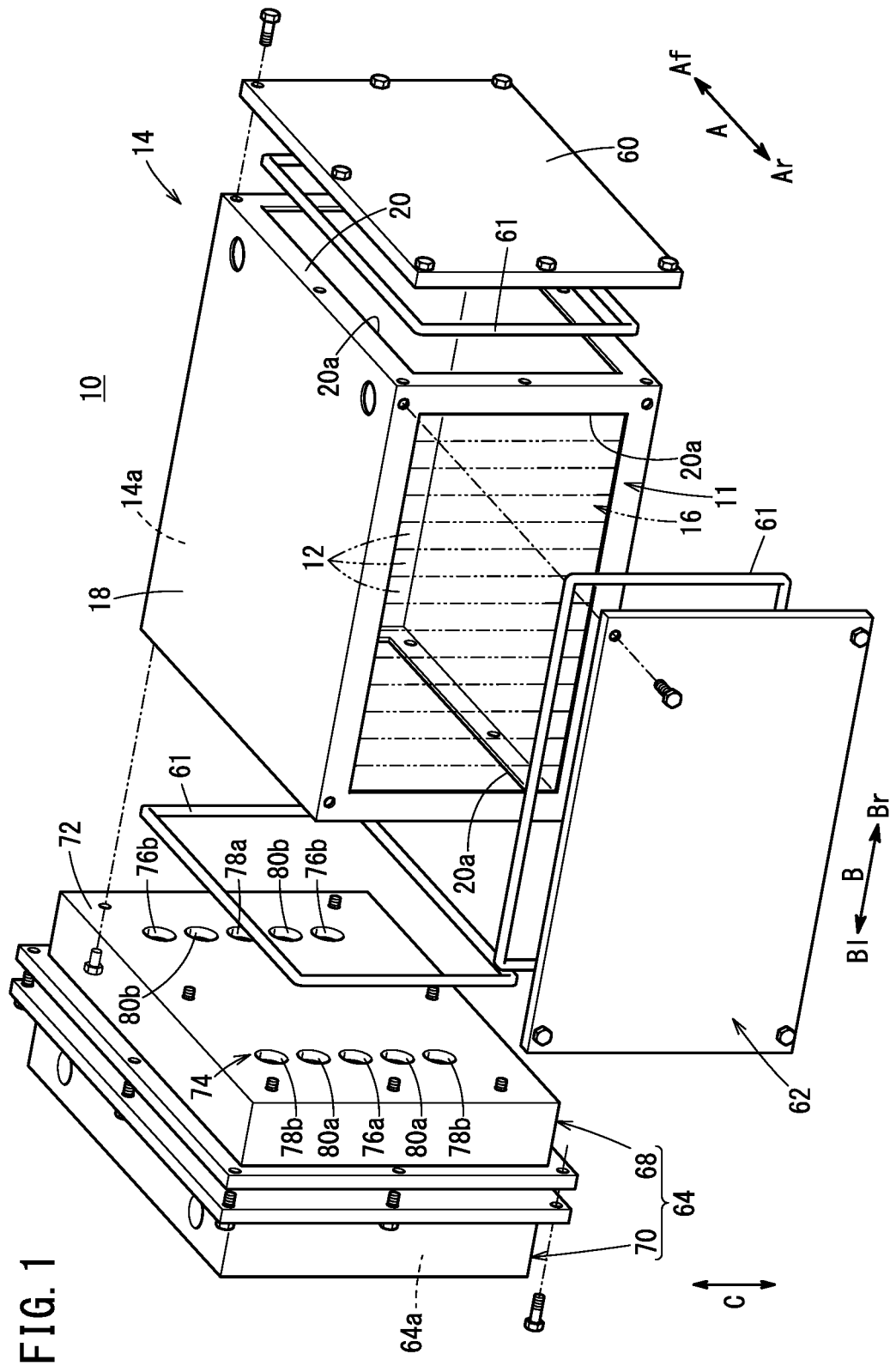
FIG. 1 is an exploded perspective view of a fuel cell system according to an embodiment.

As shown in FIG. 1, a fuel cell system 10 according to an embodiment of the present invention includes a fuel cell stack 11 having a plurality of power generation cells 12 for generating power in accordance with supply of a fuel gas and an oxygen-containing gas. The temperature of the plurality of power generation cells 12 is adjusted in accordance with supply of a coolant. A fuel cell system 10 is provided with a stack case 14 for accommodating the plurality of power generation cells 12 in a stacked state. The fuel cell system 10 is mounted, for example, in a motor room of a fuel cell vehicle (not shown).

In the state where the fuel cell system 10 is mounted on the fuel cell vehicle, the plurality of power generation cells 12 formed as a stacked body 16 are stacked along a vehicle width direction (arrow B direction) perpendicular to the vehicle length direction (arrow A direction) such that the electrode surfaces of the plurality of power generation cells 12 are in the upright position. The plurality of power generation cells 12 may be stacked in the gravity direction (arrow C direction).

Further, terminal plates and insulators (not shown) are arranged in order outward at both ends of the stacked body 16 in the stacking direction (the direction of arrow B). The terminal plate is a metal plate member for collecting electric power from the power generation cells 12, and power collecting terminals (not shown) project from predetermined positions of the stacked body 16. The insulator is made of an insulating material such as polycarbonate (PC) or phenol resin.

Figure 2:
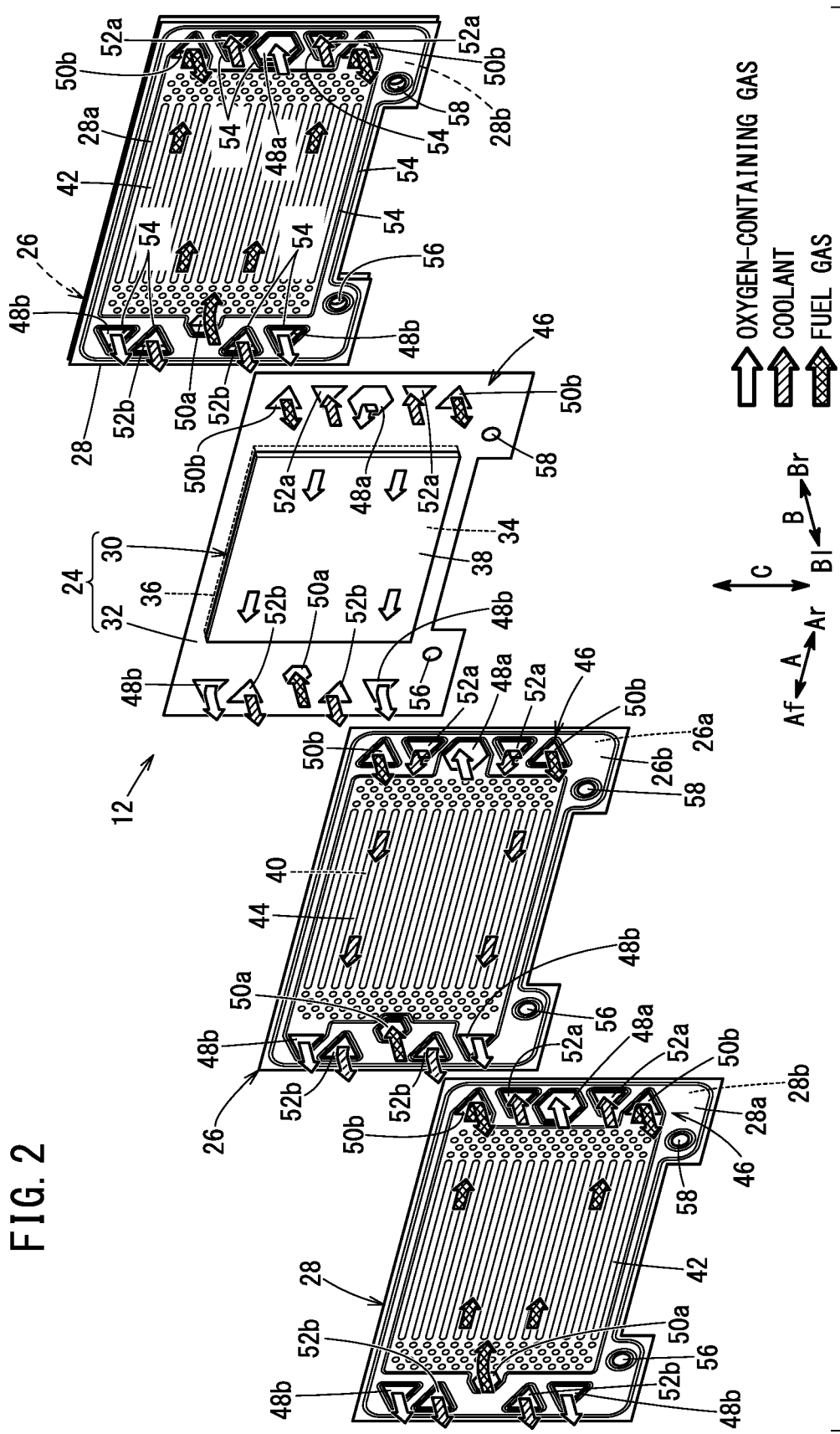
FIG. 2 is an exploded perspective view showing structure of a power generation cell of FIG. 1.

As shown in FIG. 2, in the power generation cell 12, a resin-framed MEA 24 is held between two separators (hereinafter also referred to as "first separator 26" and "second separator 28"). The first and second separators 26 and 28 are formed by press-forming a steel plate, a stainless steel plate, an aluminum plate, a plated steel plate, or a thin metal plate whose metal surfaces are subjected to anti-corrosion treatment, to have a corrugated-shape cross section. The outer peripheries of the first separator 26 and the second separator 28 are joined to each other by welding, brazing, caulking, or the like to form a joint separator.

The resin-framed MEA 24 includes a membrane electrode assembly 30 (hereinafter referred to as "MEA 30") and a resin frame member 32 which is joined to the outer peripheral portion of the MEA 30 and surrounds the outer peripheral portion. The MEA 30 has an electrolyte membrane 34, an anode 36 provided on one surface of the electrolyte membrane 34, and a cathode 38 provided on the other surface of the electrolyte membrane 34. The MEA 30 may have the electrolyte membrane 34 extending outward without using the resin frame member 32. Further, a resin film having a frame shape may be provided on both sides of the outwardly extended electrolyte membrane 34.

For example, the electrolyte membrane 34 is a solid polymer electrolyte membrane (cation exchange membrane) such as a thin membrane of perfluorosulfonic acid containing water. In addition to the fluorine-based electrolyte, an HC (hydrocarbon)-based electrolyte can be used for the electrolyte membrane 34.

The first separator 26 includes an oxygen-containing gas flow field 40 for allowing an oxygen-containing gas (e.g., air containing oxygen) to flow on a surface 26a of the resin-framed MEA 24 facing the cathode 38 (in FIG. 2, the flow direction of the oxygen-containing gas is shown on the cathode 38 of the MEA 30 for convenience). The oxygen-containing gas flow field 40 is formed of linear flow field grooves or wavy flow field grooves formed between a plurality of ridges of the first separator 26 extending in the direction of arrow A (horizontal direction).

The second separator 28 has a fuel gas flow field 42 for allowing a fuel gas (e.g., a hydrogen-containing gas) to flow on a surface 28a of the resin-framed MEA 24 facing the anode 36. The fuel gas flow field 42 is formed of linear flow field grooves or wavy flow field grooves formed between a plurality of ridges of the second separator 28 extending in the direction of arrow A.

Between the surface 26b of the first separator 26 and the surface 28b of the second separator 28 which are joined together, a coolant flow field 44 is formed for allowing a coolant (e.g., water) to flow. The coolant flow field 44 is formed between a back surface shape of the first separator 26 in which the oxygen-containing gas flow field 40 is formed, and a back surface shape of the second separator 28 in which the fuel gas flow field 42 is formed, which are stacked together.

A plurality of passages 46 through which the oxygen-containing gas, the fuel gas, and the coolant flow independently along the stacking direction of the power generation cells 12 are provided on both side portions of the power generation cells 12 in the direction of arrow A (on the arrow Ar side and arrow Af side) that is the longer side direction of the power generation cells 12.

The plurality of passages 46 provided on the arrow Ar side (rear side of the fuel cell system 10) include an oxygen-containing gas supply passage 48a as the second passage, two fuel gas discharge passages 50b as the first passages, and two coolant supply passages 52a as the third passages. The passages 46 are roughly arranged along the vertical direction. The oxygen-containing gas supply passage 48a, the two coolant supply passages 52a, and the two fuel gas discharge passages 50b extend through the power generation cells 12 in the stacking direction.

The oxygen-containing gas supply passage 48a are formed at an intermediate position of the five passages 46 arranged along the direction of arrow C. The two coolant supply passages 52a are disposed adjacent to the upper and lower sides of the oxygen-containing gas supply passage 48a so as to interpose the oxygen-containing gas supply passage 48a therebetween. The two fuel gas discharge passages 50b are disposed above the upper coolant supply passage 52a and below the lower coolant supply passage 52a, respectively, and interpose the oxygen-containing gas supply passage 48a and the two coolant supply passages 52a therebetween.

The plurality of passages 46 provided on the arrow Af side (front side of the fuel cell system 10) include two oxygen-containing gas discharge passages 48b as the second passages, a fuel gas supply passages 50a as the first passage, and two coolant discharge passages 52b as the third passages. The passages 46 are roughly arranged along the direction of arrow C. The two oxygen-containing gas discharge passages 48b, the fuel gas supply passage 50a, and the two coolant discharge passages 52b extends through the power generation cells 12 in the stacking direction.

The fuel gas supply passage 50a is formed at an intermediate position of the five passages 46 arranged along the direction of arrow C. The two coolant discharge passages 52b are disposed adjacent to the upper and lower sides of the fuel gas supply passage 50a so as to interpose the fuel gas supply passage 50a therebetween. The two oxygen-containing gas discharge passages 48b are disposed above the upper coolant discharge passages 52b and below the lower coolant discharge passages 52b, respectively, and interpose the fuel gas supply passage 50a and the two coolant discharge passages 52b therebetween.

Further, in this embodiment, the oxygen-containing gas supply passage 48a and the fuel gas supply passages 50a are formed in a hexagonal shape, for example, although not particularly limited. Further, the cross-sectional area of the fuel gas supply passages 50a may be smaller than the cross-sectional area of the oxygen-containing gas supply passage 48a. On the other hand, the oxygen-containing gas discharge passages 48b, the fuel gas discharge passages 50b, the coolant supply passages 52a, and the coolant discharge passages 52b are formed in a triangular shape, for example, although not particularly limited.

The oxygen-containing gas flow field 40 is in fluid communication with the oxygen-containing gas supply passage 48a and the two oxygen-containing gas discharge passages 48b. As the oxygen-containing gas is supplied from the oxygen-containing gas supply passage 48a, the oxygen-containing gas flows through the oxygen-containing gas flow field 40 along the direction indicated by arrow A and is discharged into the two oxygen-containing gas discharge passages 48b. The two oxygen-containing gas discharge passages 48b are arranged, for example, such that one side (bottom side) of a triangular shape faces the oxygen-containing gas flow field 40, for example.

The fuel gas flow field 42 is in fluid communication with the fuel gas supply passages 50a and the two fuel gas discharge passages 50b. As the fuel gas is supplied from the fuel gas supply passages 50a, the fuel gas flows through the fuel gas flow field 42 along the direction indicated by arrow A (in a direction opposite to the direction in which the oxygen-containing gas flows) and is discharged into the two fuel gas discharge passages 50b. The two fuel gas discharge passages 50b are arranged, for example, such that one side (bottom side) of a triangular shape faces the fuel gas flow field 42.

The coolant flow field 44 is in fluid communication with the two coolant supply passages 52a and the two coolant discharge passages 52b. As the coolant is supplied from the two coolant supply passages 52a, the coolant flows through the coolant flow field 44 along the direction indicated by arrow A (the same direction as the fuel gas) and is discharged into the two coolant discharge passages 52b. For example, each of the two coolant supply passages 52a and the two coolant discharge passages 52b is arranged so that one top portion of a triangular shape faces the coolant flow field 44.

The arranged position, number, and shape of the oxygen-containing gas passages 48 (oxygen-containing gas supply passage 48a, oxygen-containing gas discharge passages 48b), the fuel gas passages 50 (fuel gas supply passage 50a, fuel gas discharge passages 50b), and the coolant passages 52 (coolant supply passages 52a, coolant discharge passages 52b) are not limited to those described above. Each passage 46 may be appropriately designed in accordance with required specifications.

On the surfaces of the first and second separators 26 and 28, for example, a plurality of metal bead seals (seal members 54) are integrally formed by, for example, press forming so as to protrude toward the resin-framed MEA 24. Instead of the metal bead seals, convex elastic seals made of elastic material may be applied as the seal members 54.

The power generation cells 12 are provided with a first drain 56 for discharging water produced on the cathode 38 side during operation (power generation) of the fuel cell system 10. The first drain 56 is formed through a position where the first and second separators 26 and 28 and the resin frame member 32 are stacked. The first drain 56 communicates with the oxygen-containing gas discharge passage 48b through a first connecting channel (not shown) provided at an end portion (e.g., the insulator) of the stacked body 16.

Further, the power generation cells 12 are provided with a second drain 58 for discharging water produced on the anode 36 side during operation (power generation) of the fuel cell system 10. The second drain 58 is formed through a position where the first and second separators 26 and 28 and the resin frame member 32 are stacked. The second drain 58 communicates with the fuel gas discharge passage 50b through a second connecting channel (not shown) provided at an end portion (e.g., the insulator) of the stacked body 16.

Referring back to FIG. 1, the stack case 14 accommodating the plurality of power generation cells 12 has walls 18 extending in a planar manner and covering the entire of the front surface, the top surface and the bottom surface. On the other hand, the rear surface and the left and right side surfaces of the stack case 14 are formed as window frames 20 (frame shaped) each having a window 20a communicating with the internal space 14a of the stack case 14.

The terminal plate and the insulating plate (not shown) provided on one end side (arrow Br side) of the stacked body 16 in the stacking direction are accommodated in the stack case 14 together with the power generation cells 12. A side wall 60 for closing the window 20a of the stack case 14 is attached to the one end of the stack case 14 in the direction of arrow B with the seal member 61 interposed therebetween. The side wall 60 constitutes one end plate for applying a fastening load in the stacking direction of the power generation cells 12. A rear wall 62 for closing the window 20a is also attached to the rear surface of the stack case 14 with the seal member 61 interposed therebetween.

The terminal plate and the insulating plate (not shown) provided on the other end side (arrow Bl side) of the stacked body 16 in the stacking direction are accommodated in the stack case 14 together with the power generation cells 12. Then, the auxiliary device case 64 is attached to the side surface of the stack case 14 on the other end side in the stacking direction of the power generation cells 12 with the seal member 61 interposed therebetween so as to close the window 20a.

Figure 3:
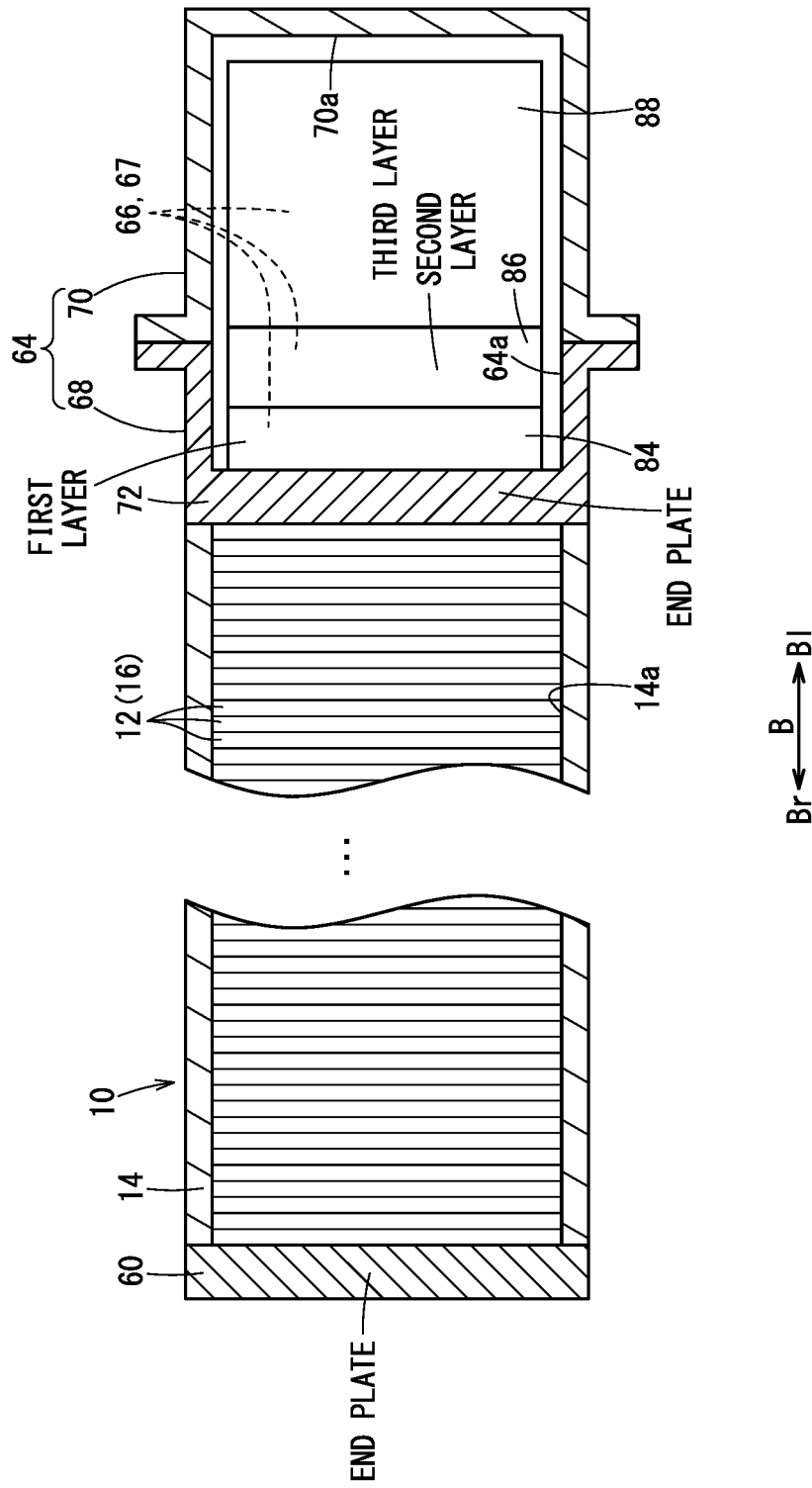
FIG. 3 is an explanatory view showing layered structure inside an auxiliary device case.

The auxiliary device case 64 is a protective case for accommodating and protecting piping and the auxiliary devices, and is fixed in the horizontal direction of the stack case 14. As shown in FIG. 3, the piping and the auxiliary devices include auxiliary devices 66 (devices) and piping 67 of the fuel cell system 10, and make the fuel gas, the oxygen-containing gas, and the coolant, which are fluids, flow. The auxiliary device case 64 has a hollow first case member 68 screwed to the stack case 14 and a hollow second case member 70 joined to the first case member 68, and an internal space 64a for accommodating the piping and the auxiliary devices is formed inside these members.

The first case member 68 is joined to the stack case 14 by bolts and has an attaching wall 72 which partitions the internal space 14a of the stack case 14 and the internal space 64a of the auxiliary device case 64. The attaching wall 72 functions as the end plate for applying the fastening load in the stacking direction to the stacked body 16 of the power generation cells 12.

Returning to FIG. 1, the attaching wall 72 has a plurality of through holes 74 communicating with the plurality of passages 46 (the oxygen-containing gas passages 48, the fuel gas passages 50, and the coolant passages 52) of the power generation cells 12, respectively. The attaching wall 72 may have a pair of long holes extending in the vertical direction on the arrow Ar side and the arrow Af side for allowing pipes from the piping and the auxiliary devices described below to extend therethrough correspondingly to respective passages 46.

The plurality of through holes 74 are formed so as to penetrate the attaching wall 72 in the thickness direction. The through holes 74 includes: an oxygen-containing gas introduction through hole 76a communicating with the oxygen-containing gas supply passage 48a; two oxygen-containing gas lead-out through holes 76b communicating with the two oxygen-containing gas discharge passages 48b; a fuel gas introduction through hole 78a communicating with the fuel gas supply passage 50a; two fuel gas lead-out through holes 78b communicating with the two fuel gas discharge passages 50b; two coolant introduction through holes 80a communicating with the two coolant supply passages 52a; and two coolant lead-out through holes 80b communicating with the two coolant discharge passages 52b. Although not shown, gaskets are attached to the inner walls of the through holes 74. The gaskets are formed in a circular shape on their outer side (arrow Bl side) and gradually change their shapes to correspond to the shapes of respective passages 46 toward their inner sides (arrow Br side). The shapes of the inner walls of the through holes 74 themselves may be gradually changed.

As shown in FIG. 3, the piping and the auxiliary devices including the auxiliary device 66 and the piping 67 of the fuel cell system 10 are stored in the internal space 64a inside the auxiliary device case 64. The internal space 64a is divided into a first layer 84, a second layer 86, and a third layer 88 in order outward from the fuel cell stack 11 (in the direction of arrow B1).

As shown in FIG. 3, the first layer 84 is provided at a position closest to the attaching wall 72 of the first case member 68. The first layer 84 is a section layered parallel to the surface of the adjacent attaching wall 72 (end plate). The first layer 84 is ranged from the attaching wall 72 to a positioned on the attaching wall side (inner side) of the first connecting portion 92 of the cathode-side discharge pipes 90 described later (not including the first connecting portion 92). The second layer 86 is a section layered on the adjacent first layer 84 on the arrow B1 side (outer side). The second layer 86 is ranged from the first connecting portion 92 (including the first connecting portion 92) to a position on the inner side (on the arrow Br side) of the humidifier 94 (not including the humidifier 94). The third layer 88 is a section layered on the adjacent second layer 86 on the arrow B1 side (outer side). The third layer 88 is ranged from the humidifier 94 to the internal end face 70a of the second case member 70.

Figure 5:
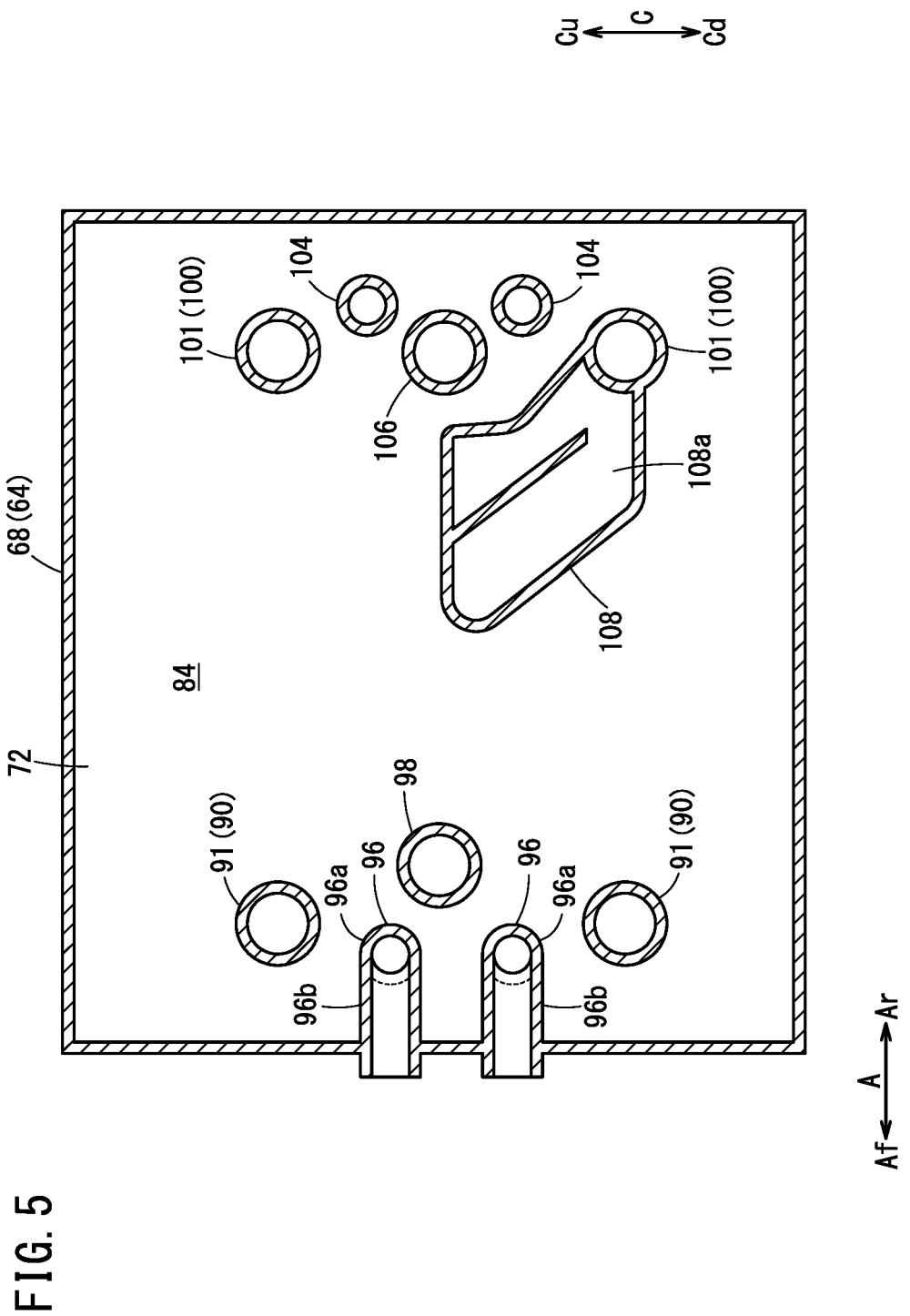
FIG. 5 is a diagram illustrating an arrangement of the first layer along the V-V line of FIG. 4.

As shown in FIG. 5, the first layer 84 is provided with first penetrating portions 91 of the cathode-side discharge pipes 90, coolant discharge pipes 96, and a fuel gas supply pipe 98 on the arrow Af side. On the arrow Ar side of the first layer 84, second penetrating portions 101 of the anode-side discharge pipes 100, coolant supply pipes 104, a cathode-side supply pipe 106, and a part of a gas-liquid separator 108 for fuel exhaust gas are provided.

The two first penetrating portions 91 of the cathode-side discharge pipes 90 are connected to the oxygen-containing gas lead-out through holes 76b (see FIG. 1). One of the first penetrating portions 91 is disposed near an end on the arrow Cu side (on the upper side in the mounted state), and the other of the first penetrating portions 91 is disposed near an end on the arrow Cd side (on the lower side in the mounted state). These first penetrating portions 91 are arranged so as to interpose the coolant discharge pipe 96 in the direction indicated by arrow C (the vertical direction in the mounted state). Each of the first penetrating portions 91 extends in a direction perpendicular to the main surface of the attaching wall 72 (the thickness direction of the first layer 84), and penetrates the first layer 84 in the thickness direction.

The two coolant discharge pipes 96 are provided in the first layer 84. The two coolant discharge pipes 96 are disposed adjacent to both sides of the fuel gas supply pipe 98 in the direction of arrow C. Each of the coolant discharge pipes 96 has a perpendicular portion 96a extending in a direction perpendicular to the attachment wall 72 and an in-layer pipe portion 96b bent from the perpendicular portion 96a and extending in the in-layer direction, and the coolant discharge pipes 96 are bent in an L-shape when viewed in the direction of arrow C. The perpendicular portions 96a are respectively connected to the coolant introduction through holes 80a. The in-layer pipe portions 96b extend in the direction of arrow Af and penetrate the wall of the first case member 68. The distal ends of the in-layer pipe portions 96b are connected to hoses (not shown) for guiding the coolant to a radiator.

One fuel gas supply pipe 98 is provided in the vicinity of the center of the first layer 84 in the direction of arrow C. The fuel gas supply pipe 98 extends in the direction perpendicular to the main surface of the attaching wall 72 (the thickness direction of the first layer 84), and penetrates the first layer 84 in the thickness direction.

The two second penetrating portions 101 of the anode-side discharge pipe 100 are connected to the fuel gas lead-out through holes 78b (see FIG. 1), respectively. The two second penetrating portions 101 are provided near ends on the Cu side (upper side in the mounted state) and the Cd side (lower side of the mounted state) in the direction of arrow C, respectively. The second penetrating portions 101 extend in the direction perpendicular to the main surface of the attaching wall 72 (the thickness direction of the first layer 84) and penetrate the first layer 84 in the thickness direction.

The two coolant supply pipes 104 are provided in the first layer 84. The two coolant supply pipes 104 are disposed adjacent to both sides of the cathode-side supply pipe 106 in the direction of arrow C. In the first layer 84, the coolant supply pipes 104 extend in the thickness direction of the first layer 84 and penetrate the first layer 84 in the thickness direction.

Figure 6:
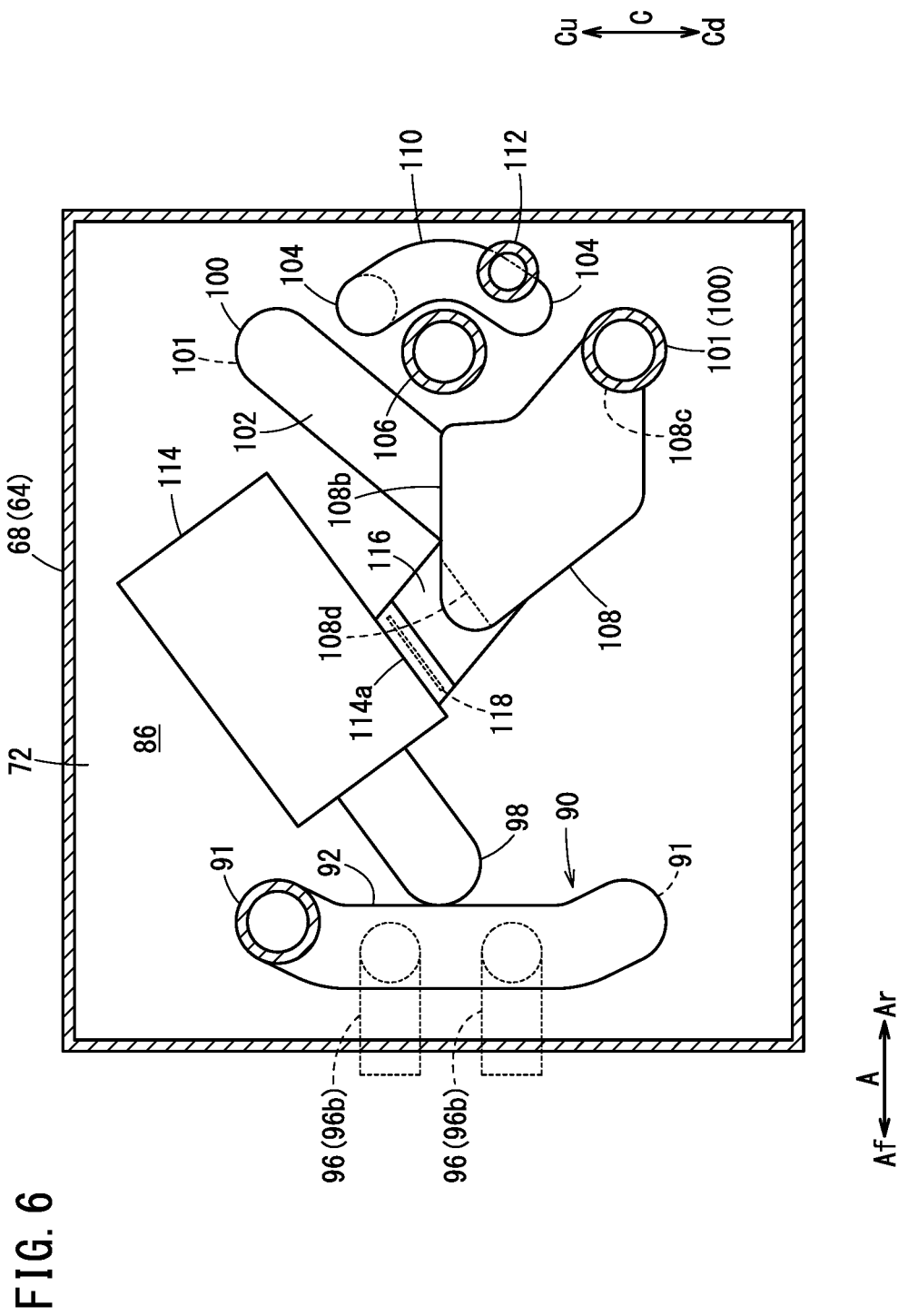
FIG. 6 is a diagram illustrating an arrangement of the second layer along line VI-VI of FIG. 4.

The gas-liquid separator 108 is a box-shaped member, and is arranged in the first layer 84 and the second layer 86 as shown in FIG. 6. As shown in FIG. 5, the gas-liquid separator 108 is provided adjacent to the lower second penetrating portion 101 on the arrow Cd side which is the lower side in the mounted state. The gas-liquid separator 108 has a bent flow path 108a therein in order to separate water in the fuel exhaust gas.

As shown in FIG. 6, a first connecting portion 92 of the cathode-side discharge pipes 90, a fuel gas supply pipe 98, a second connecting portion 102 of the anode-side discharge pipes 100, a third connecting portion 110 and a third penetrating portion 112 of the coolant supply pipes 104, the cathode-side supply pipe 106, the gas-liquid separator 108, and an injector 114 are arranged in the second layer 86.

In the second layer 86, the first connecting portion 92 extends in the direction of arrow C along the in-layer direction of the second layer 86 (a direction parallel to the main surface of the attaching wall 72). The first connecting portion 92 is disposed so as to extend over the coolant discharge pipes 96 on the outer side, and connects the first penetrating portion 91 on the arrow Cd side and the first penetrating portion 91 on the arrow Cu side. The first penetrating portion 91 on the arrow Cu side (upper side in the mounted state) extends in the direction perpendicular to the layer direction of the second layer 86 and penetrates the second layer 86 in the thickness direction.

The fuel gas supply pipe 98 is bent along the in-layer direction in the second layer 86, and is connected to the injector 114. The anode-side discharge pipes 100 have, in the second layer 86, the second connecting portion 102 connecting the two second penetrating portions 101. One end of the second connecting portion 102 is connected to the second penetrating portion 101 on the arrow Cu side. The second connecting portion 102 extends obliquely so as to detour the cathode-side supply pipe 106, and the other end thereof is connected to an inlet 108b of the gas-liquid separator 108. A liquid drainage portion 108c is provided at an end portion of the gas-liquid separator 108 on the arrow Cd side, and the liquid discharge portion 108c communicates with the second penetrating portion 101 on the arrow Cd side. That is, the second connecting portion 102 connects the two second penetrating portions 101 via the gas-liquid separator 108. The second penetrating portion 101 on the arrow Cd side extends in the direction perpendicular to the layer direction of the second layer 86 and penetrates the second layer 86 in the thickness direction. The fluid containing mainly the liquid phase components after being separated in the gas-liquid separator 108 is discharged through the second penetrating portion 101 on the arrow Cd side.

A gas outlet 108d is provided on the side of arrow Cu of the gas-liquid separator 108. From the gas outlet 108d, the gas phase components of the fuel exhaust gas, from which the liquid phase components has been removed, flows out. A communication pipe 116 extending along the second layer 86 is connected to the gas outlet 108d. The communication pipe 116 is connected to the circulation port 114a of the injector 114 through a check valve 118. The fuel gas from the gas outlet 108d is introduced into the fuel gas supply pipe 98 through the injector 114. The fuel gas from a fuel gas supply system is introduced to a fuel gas tube (not shown) connected the injector 114.

The two coolant supply pipes 104 communicate with each other through a third connecting portion 110 provided in the second layer 86. The third connecting portion 110 extends in the direction of arrow C along the in-layer direction of the second layer 86. As in the illustrated example, the third connecting portion 110 may be bent so as to detour the cathode-side supply pipe 106. The third penetrating portion 112 extends from the third connecting portion 110 in the direction perpendicular to the second layer 86. The third penetrating portion 112 communicates with the third connecting portion 110 and extends to the third layer 88.

The cathode-side supply pipe 106 extends in the direction perpendicular to the second layer 86 and penetrates the second layer 86 in the thickness direction.

Figure 4:
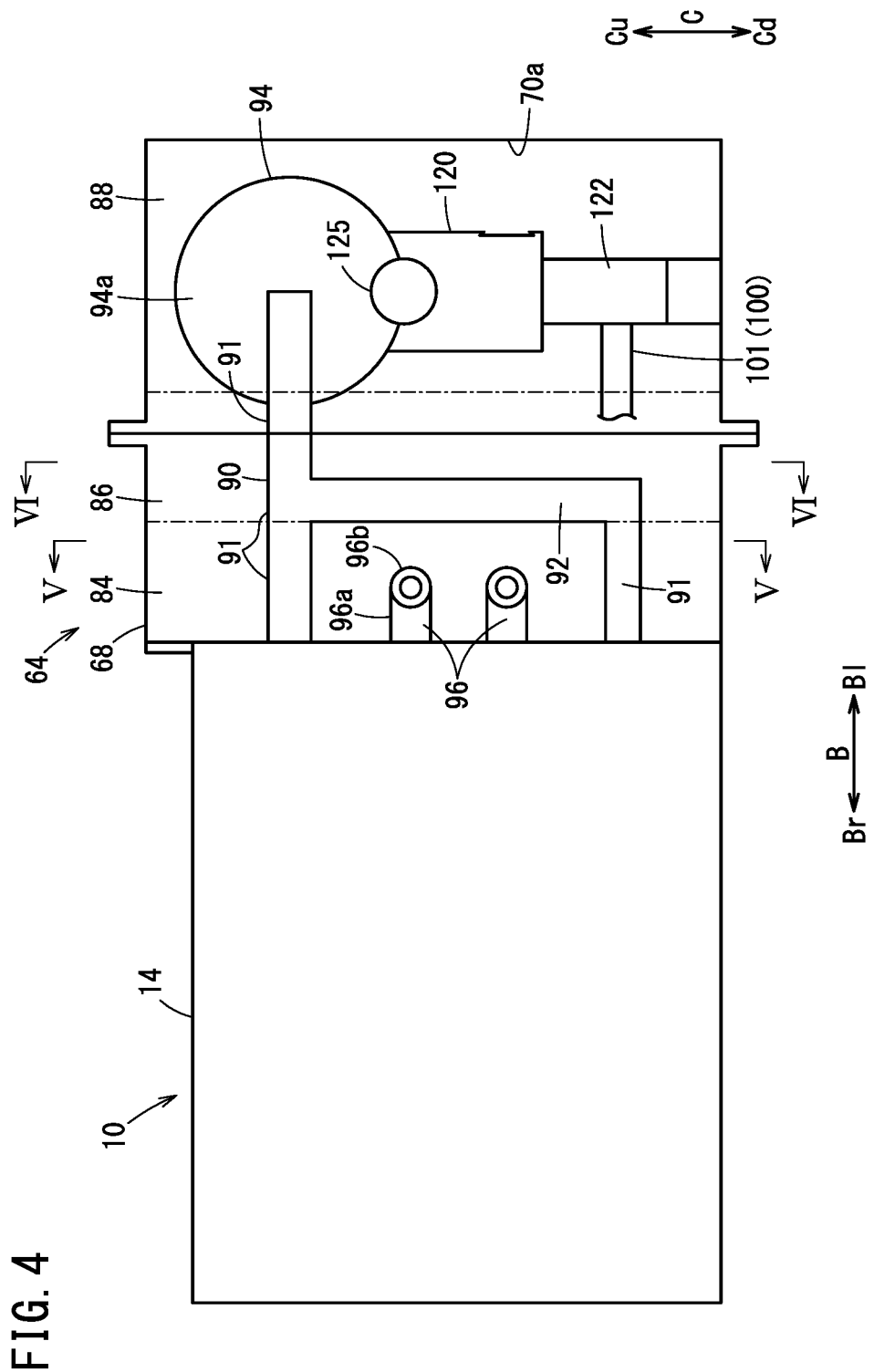
FIG. 4 is a front view showing an arrangement of coolant discharge piping, cathode-side discharge piping and a humidifier inside the auxiliary device case.
Figure 7:
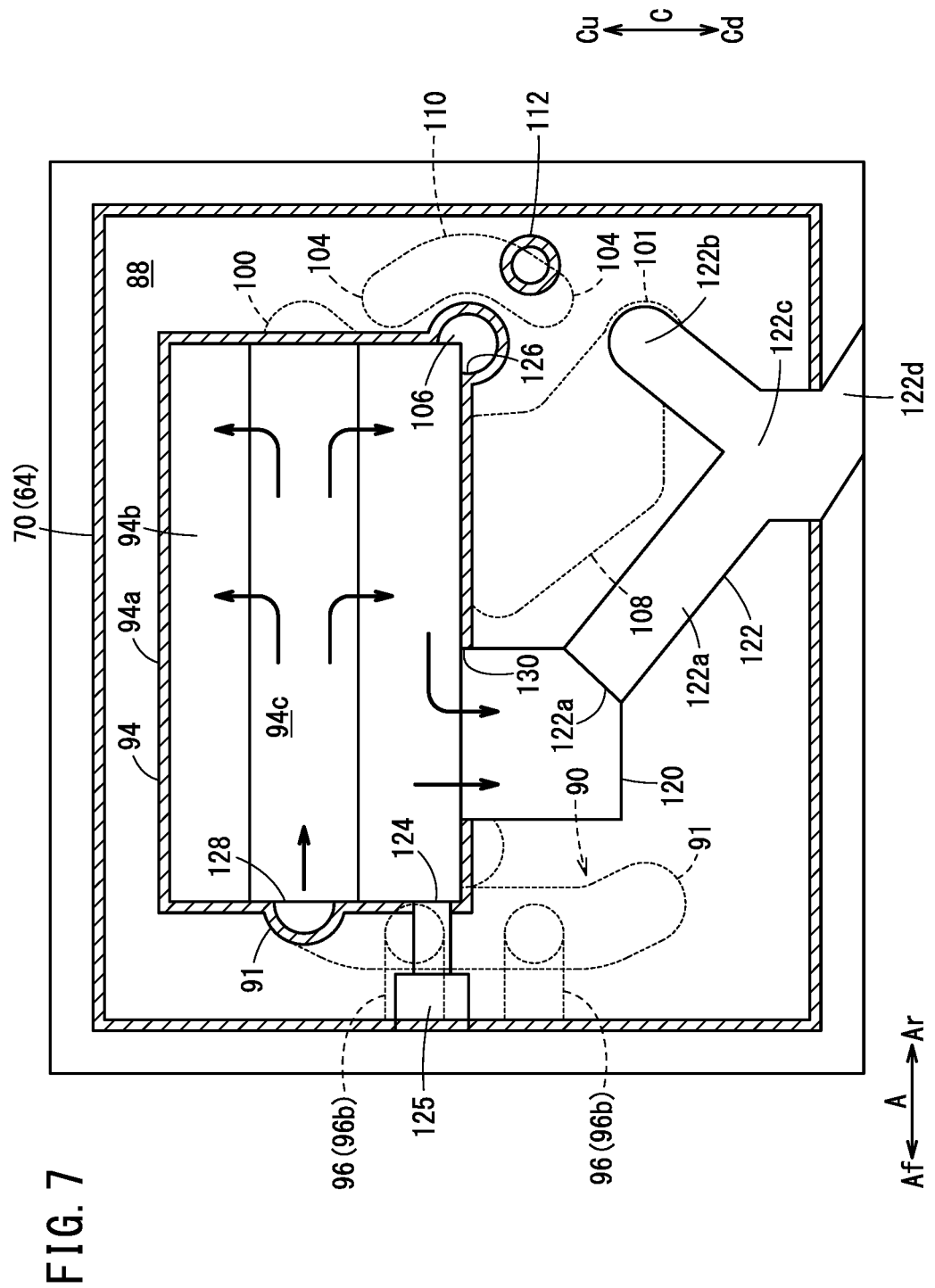
FIG. 7 is a diagram illustrating an arrangement of the third layer.

As shown in FIG. 7, the third layer 88 mainly includes the humidifier 94, a stop valve 120, and an exhaust gas pipe merging section 122. The humidifier 94 is arranged in the third layer 88 at a position relatively closer to the upper side (arrow Cu side) in the mounted state. The humidifier 94 has a cylindrical casing 94a as shown in FIG. 4. As shown in FIG. 7, the casing 94a is arranged such that its central axis is aligned with the direction of arrow A along the third layer 88.

The humidifier 94 includes a hollow fiber module 94b having a cylindrical shape inside the casing 94a, and a center hole 94c extending along the central axis of the hollow fiber module 94b. The hollow fiber module 94b has a plurality of hollow fibers. The hollow fiber module 94b exchanges water content between a fluid flowing in the external space communicating with the center hole 94c outside the hollow fibers and a fluid flowing inside the internal space of the hollow fibers.

The internal space of each hollow fiber of the hollow fiber module 94b communicates with the first inlet port 124 on the arrow Af side and the first outlet port 126 on the arrow Ar side. An oxygen-containing gas introduction pipe 125 is connected to the first inlet port 124. The oxygen-containing gas introduction pipe 125 constitutes a flow path for introducing the oxygen-containing gas supplied from an air pump (not shown) into the first inlet port 124. A cathode-side supply pipe 106 is connected to the first outlet port 126. The first outlet port 126 of the humidifier 94 is disposed at a position overlapping the oxygen-containing gas introduction through hole 76a when viewed in a direction perpendicular to the layer direction.

The center hole 94c communicates with the external space outside the hollow fibers. The center hole 94c serves as a second inlet port 128 that opens on the arrow Af side. The first penetrating portion 91 of the cathode-side discharge pipe 90 is connected to the second inlet port 128 of the center hole 94c. An end of the center hole 94c of the humidifier 94 is disposed at a position overlapping one of the first penetrating portions 91 (oxygen-containing gas lead-out through holes 76b) when viewed in the direction perpendicular to the layer direction.

A second outlet port 130 serving as an outlet for the oxygen-containing exhaust gas flowing through the external space outside the hollow fibers is provided on a side portion of the casing 94a on the arrow Cd side. The stop valve 120 is attached to the second outlet port 130 of the casing 94a so as to extend in the direction indicated by arrow Cd. As shown in FIG. 4, the stop valve 120 is arranged in a direction along the in-layer direction of the third layer 88, and as shown in FIG. 7, the stop valve 120 is arranged parallel to the first connecting portion 92. The stop valve 120 is provided with a shutoff valve capable of preventing the flow of the oxygen-containing exhaust gas from the cathode exhaust pipes 90. One end of the exhaust gas pipe merging section 122 is connected to an outlet of the stop valve 120.

The exhaust gas pipe merging section 122 is formed to extend in the layer direction of the third layer 88. The exhaust gas pipe merging section 122 is formed in a Y-shape as viewed in the direction perpendicular to the layer direction, and the first branch pipe 122a is connected to the outlet of the stop valve 120, and the second branch pipe 122b is connected to the second penetrating portion 101 of the anode-side discharge pipe 100 disposed on the arrow Cd side. The first branch pipe 122a and the second branch pipe 122b merge at the merging portion 122c. An exhaust gas port 122d is provided on the arrow Cd side of the merging portion 122c. The exhaust gas port 122d extends to the outside through a lower end portion (the end in the direction of arrow Cd) of the auxiliary device case 64.

The fuel cell system 10 of this embodiment is configured as described above, and its operation will be described below.

In the fuel cell system 10, the fuel gas is supplied to the fuel gas supply pipe 98 under the operation of the injector 114 shown in FIG. 6. The fuel gas in the fuel gas supply pipe 98 flows into the fuel gas supply passage 50a shown in FIG. 2 through the fuel gas introduction through hole 78a shown in FIG. 1.

The fuel exhaust gas (anode off-gas) flows out from the two fuel gas discharge passages 50b. The fuel exhaust gas is discharged to the anode-side discharge pipes 100 in the first layer 84 shown in FIG. 5 through the two fuel gas discharge through holes 78b shown in FIG. 1. As shown in FIG. 6, the fuel exhaust gas from the anode-side discharge pipes 100 is separated into liquid phase components and gas phase components in the gas-liquid separator 108 in the second layer 86. The separated gas phase components are returned to the fuel gas supply pipe 98 through the injector 114. The fuel exhaust gas mainly containing the liquid phase components in the gas-liquid separator 108 is discharged through the second penetrating portion 101 on the arrow Cd side to the exhaust gas pipe merging section 122 in the third layer 88.

The oxygen-containing gas flows in from the oxygen-containing gas introduction pipe 125 shown in FIG. 7 is humidified by the humidifier 94, and is introduced into the cathode-side supply pipe 106. The oxygen-containing gas in the cathode-side supply pipe 106 flows into the oxygen-containing gas supply passage 48*a* shown in FIG. 2 through the oxygen-containing gas introduction through hole 76*a* shown in FIG. 1.

The oxygen-containing exhaust gas (cathode off-gas) flows out from the two oxygen-containing gas discharge passages 48*b*. The oxygen-containing exhaust gas is discharged to the first penetrating portions 91 of the cathode-side discharge pipes 90 in the first layer 84 shown in FIG. 5 through the two oxygen-containing gas lead-out through holes 76*b* shown in FIG. 1. The oxygen-containing exhaust gas from the first penetrating portions 91 joins through the first connecting portion 92 in the second layer 86 and is introduced into the second inlet port 128 of the humidifier 94 in the third layer 88 shown in FIG. 7 through the first penetrating portion 91 on the arrow Cu side (on the upper side in the mounted state).

The oxygen-containing exhaust gas introduced into the humidifier 94 is discharged to the exhaust gas pipe merging section 122 through the stop valve 120, after having humidified the oxygen-containing gas to be supplied through the hollow fiber module 94*b*.

The oxygen-containing exhaust gas and the fuel exhaust gas are merged at the exhaust gas pipe merging section 122 shown in FIG. 7, and are discharged from the exhaust gas port 122*d* of the auxiliary device case 64.

The technical ideas and effects of the present invention which can be understood from the above embodiments will be described below.

The fuel cell system 10 includes: the fuel cell stack 11 having the pair of end plates (for example, the side wall 60 and the attaching wall 72); the plurality of through holes formed at the plurality of positions of one (for example, the attaching wall 72) of the pair of the end plates and allowing the fuel gas, the oxygen-containing gas, and the coolant to pass, respectively, through the one of the pair of the end plates; the auxiliary device case 64 provided adjacent to the one of the pair of end plates through which the through holes are formed; the cathode-side discharge pipes 90 connected to the at least two of the through holes (for example, the oxygen-containing gas lead-out through holes 76*b*) to allow the oxygen-containing exhaust gas discharged from the fuel cell stack 11 to flow therethrough; and the coolant discharge pipe 96 connected to the other (for example, the coolant lead-out through hole 80*b*) of the through holes to allow the coolant discharged from the fuel cell stack 11 to flow therethrough, wherein the auxiliary device case 64 contains the first layer 84, the second layer 86 and the third layer 88, the first layer being an innermost layer positioned closest to the one (the attaching wall 72) of the pair of the end plates, the second layer 86 layer being positioned on the outer side of the first layer 84, and the third layer being positioned on the outer side of the second layer 86, the coolant discharge pipe 96 is disposed in the first layer 84, the cathode-side discharge pipes 90 include: a plurality of first penetrating portions 91 connected respectively to the at least two of the through holes on both sides of the coolant discharge pipe, and penetrating through the first layer 84 in the layer thickness direction; and the first connecting portion 92 provided in the second layer 86, extending in a layer direction so as to straddle the coolant discharge pipe 96 on the outer side of the first layer, and connecting the plurality of first penetrating portions 91.

According to the configuration described above, the cathode-side discharge pipes 90 can be efficiently disposed inside the auxiliary device case 64 while avoiding interference with the coolant discharge pipes 96.

The fuel cell system 10 may further include the humidifier 94 disposed in the third layer 88 for humidifying the oxygen-containing gas to be supplied to the fuel cell system 10, and the cathode-side discharge pipes 90 may be connected to the humidifier 94 through one of the first penetrating portions 91 penetrating the second layer 86 in the thickness direction. According to this configuration, the cathode-side discharge pipes 90 can be connected to the humidifier 94 through the shortest path, and the cathode-side discharge pipes 90 can be efficiently disposed inside the auxiliary device case 64.

In the fuel cell system 10 described above, the humidifier 94 may have a cylindrical casing 94*a*, the axis of which may extend along the in-layer direction of the third layer 88, and the one of the first penetrating portions 91 may be connected to one end of the casing 94*a* of the humidifier 94 in the axial direction. In this case, the humidifier 94 may be disposed closer to the upper side (arrow Cu side) of the mounted state. According to this configuration, it is possible to increase a space available for piping or the like the third layer 88.

The fuel cell system 10 may further include the stop valve 120 connected to the second outlet port 130 of the humidifier 94 and configured to stop the flow of the oxygen-containing exhaust gas flowing out of the humidifier 94, wherein the stop valve 120 may be disposed in the third layer 88 along the in-layer direction and may project from the humidifier 94 in a direction parallel to the first connecting portion 92. According to this configuration, since the stop valve 120 can be arranged in the vacant space in the third layer 88, the usability of the internal space 64*a* is improved.

The fuel cell system 10 may further include the anode-side discharge pipes 100 which are connected to at least two of the through holes (for example, the fuel gas lead-out through holes 78*b*) and through which the fuel exhaust gas discharged from the fuel cell stack 11 flows, and the anode-side discharge pipes 100 may have the plurality of second penetrating portions 101 which are respectively connected to the at least two of the through holes (for example, the fuel gas lead-out through holes 78*b*) and penetrate the first layer 84 in the thickness direction, and a second connecting portion 102 which is provided in the second layer 86 and extends in the layer direction of the second layer 86 and communicates with the plurality of second penetrating portions 101. According to this configuration, the second connecting portion 102 of the anode-side discharge pipes 100 can be provided in the second layer 86 as with the first connecting portion 92 of the cathode-side discharge pipe 90, so that the size of the anode-side discharge pipes 100 can be reduced in the thickness direction perpendicular to the layers.

The fuel cell system 10 may further include the exhaust gas pipe merging section 122 arranged in the third layer 88 and configured to merge the oxygen-containing exhaust gas flowing out through the stop valve 120 and the fuel exhaust gas discharged from the anode-side discharge pipes 100, wherein one of the second penetrating portions 101 may penetrate the second layer 86 in the thickness direction to connect the anode-side discharge pipes 100 to the exhaust gas pipe merging section 122. According to this configuration, since the exhaust gas pipe merging section 122 can be provided in the vacant space that is not occupied by the humidifier 94 in the third layer 88, the vacant space can be used effectively, and the piping structure can be made compact.

In the fuel cell system 10 described above, the second connecting portion 102 may include the gas-liquid separator 108 which is disposed along the in-layer direction of the second layer 86 and configured to separates water in the fuel exhaust gas. According to this configuration, the vacant space in the second layer 86 can be effectively used, and the piping structure can be made compact.

In the fuel cell system 10 described above, in the mounted state, the humidifier 94 may be positioned on the vertical upper side in the third layer 88, the stop valve 120 and the exhaust gas pipe merging section 122 may be disposed below the humidifier 94 in the third layer 88, and the outlet of the exhaust gas pipe merging section 122 may be provided at the lower end of the auxiliary device case 64. According to this configuration, when the produced water is discharged from the exhaust gas pipe merging section 122, the water can be discharged in accordance with the gravity, so that it is not necessary to increase the pressure of the exhaust gas more than necessary, and the efficiency of the fuel cell system 10 can be enhanced.

Although preferred embodiments of the present invention have been described above, the present invention is not limited to the above-described embodiments, and various modifications can be made without departing from the gist of the present invention.

What is claimed is:

1. A fuel cell system comprising:
   a fuel cell stack having a pair of end plates;
   a plurality of through holes formed at a plurality of positions of one of the pair of the end plates and allowing a fuel gas, an oxygen-containing gas, and a coolant to pass, respectively through the one of the pair of the end plates;
   an auxiliary device case provided adjacent to the one of the pair of the end plates through which the through holes are formed;
   cathode-side discharge pipes connected to at least two of the through holes to allow an oxygen-containing exhaust gas discharged from the fuel cell stack to flow therethrough; and
   a coolant discharge pipe connected to another of the through holes to allow the coolant discharged from the fuel cell stack to flow therethrough,
   wherein the auxiliary device case contains a first layer, a second layer and a third layer, the first layer being an innermost layer positioned closest to the one of the pair of the end plates, the second layer being positioned on an outer side of the first layer, and the third layer being positioned on an outer side of the second layer,
   the coolant discharge pipe is disposed in the first layer,
   the cathode-side discharge pipes include: a plurality of first penetrating portions connected respectively to the at least two of the through holes on both sides of the coolant discharge pipe, and penetrating through the first layer in a layer thickness direction; and a first connecting portion provided in the second layer, extending in a layer direction so as to straddle the coolant discharge pipe on the outer side of the first layer, and connecting the plurality of first penetrating portions.

2. The fuel cell system according to claim 1, further comprising a humidifier disposed in the third layer for humidifying the oxygen-containing gas to be supplied to the fuel cell system, and the cathode-side discharge pipes are connected to the humidifier through one of the first penetrating portions penetrating the second layer in the thickness direction.

3. The fuel cell system according to claim 2, wherein the humidifier comprises a cylindrical casing, an axis of which extends along an in-layer direction of the third layer, and the one of the first penetrating portions is connected to one end of the casing of the humidifier in an axial direction.

4. The fuel cell system according to claim 3, further comprising:
   a stop valve connected to an outlet port of the humidifier and configured to stop a flow of the oxygen-containing exhaust gas flowing out of the humidifier,
   wherein the stop valve is disposed in the third layer along an in-layer direction and projects from the humidifier in a direction parallel to the first connecting portion.

5. The fuel cell system according to claim 4, further comprising:
   anode-side discharge pipes which are connected to at least two of the through holes and through which a fuel exhaust gas discharged from the fuel cell stack flows, and the anode-side discharge pipe have a plurality of second penetrating portions which are respectively connected to the at least two of the through holes and penetrate the first layer in the thickness direction, and a second connecting portion which is provided in the second layer and extends in the layer direction of the second layer and communicates with the plurality of second penetrating portions.

6. The fuel cell system according to claim 5, further comprising:
   an exhaust gas pipe merging section arranged in the third layer and configured to merge the oxygen-containing exhaust gas flowing out through the stop valve and the fuel exhaust gas discharged from the anode-side discharge pipes,
   wherein one of the second penetrating portions penetrate the second layer in the thickness direction and be connected to the exhaust gas pipe merging section.

7. The fuel cell system according to claim 6, wherein in a state where the fuel cell system is mounted for use, the humidifier is positioned on a vertical upper side in the third layer, the stop valve and the exhaust gas pipe merging section are positioned below the humidifier in the third layer, and
   an outlet of the exhaust gas pipe merging section is provided at a lower end of the auxiliary device case.

8. The fuel cell system according to claim 5, wherein the second connecting portion includes a gas-liquid separator which is disposed along the in-layer direction of the second layer and configured to separate water in the fuel exhaust gas.

* * * * *